(12) United States Patent
Hayashida

(10) Patent No.: US 6,973,645 B2
(45) Date of Patent: Dec. 6, 2005

(54) COMPILER, OPERATION PROCESSING SYSTEM AND OPERATION PROCESSING METHOD

(75) Inventor: Seiji Hayashida, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 638 days.

(21) Appl. No.: 10/229,015

(22) Filed: Aug. 28, 2002

(65) Prior Publication Data

US 2004/0003379 A1    Jan. 1, 2004

(30) Foreign Application Priority Data

Jun. 28, 2002    (JP) .............................. 2002-190818

(51) Int. Cl.$^7$ .............................................. G06F 9/45
(52) U.S. Cl. ..................................... 717/140; 717/163
(58) Field of Search ........................................ 717/140

(56) References Cited

U.S. PATENT DOCUMENTS

| | | | |
|---|---|---|---|
| 5,193,180 A | * | 3/1993 | Hastings ..................... 717/163 |
| 5,335,344 A | * | 8/1994 | Hastings ..................... 714/35 |

OTHER PUBLICATIONS

D. A. Patterson, et al., Morgan Kaufmann Publishers, Inc., Second Edition, Chapter 3.4, pp. 152-159, "Computer Architecture a Quantitative Approach", 1990.

\* cited by examiner

Primary Examiner—John Chavis
(74) Attorney, Agent, or Firm—Oblon, Spivak, McClelland, Maier & Neustadt, P.C.

(57) ABSTRACT

A compiler which generates object codes based on a source program includes: an instruction detection section detecting instruction scheduling information described in the source program, the instruction scheduling information describing first and second operation instruction information and the number of cycles or the number of instructions to be secured between the object code corresponding to the first operation instruction information and the object code corresponding to the second operation instruction information; and an object code insertion section inserting an object code, which is irrelevant to the object code corresponding to the first operation instruction information and the object code corresponding to the second operation instruction, between these object codes by as much as the number of cycles or number of instructions.

17 Claims, 14 Drawing Sheets

```
void x(){
    int a;
}
```

```
int hw(int para){
    volatile int *p=(int*)0x1000;
  *p = para;
  return *p;
}
```

F I G. 5

```
addiu r2, r0, 0x1000    /* INPUT VALUE AT 0x1000 TO r2 */
sw  r4, 0(r2)           /* WRITE r4(para IN SOURCE PROGRAM)
                           TO MEMORY AT ADDRESS OF r2 */
lw  r2, 0(r2)           /* INPUT CONTENT READ FROM MEMORY
                           AT ADDRESS OF r2 TO r2 */
jr  ra                  /* FINISH FUNCTION AND RETURN TO
                           CALL ORIGINAL */
nop                     /* nop FOR DELAY BRANCHING */
```

F I G. 6

```
int hw(int para){
    volatile int *p=(int*)0x1000
  *p = para;
  nop();
  nop();
  nop();
  return *p;
}
```

F I G. 7

```
addiu r2, r0, 0x1000      /* INPUT VALUE AT 0x1000 TO r2 */
sw r4, 0(r2)              /* WRITE r4 (para IN SOURCE PROGRAM)
                             TO MEMORY AT ADDRESS OF r2 */
nop
nop
nop
lw r2, 0(r2)              /* INPUT CONTENT READ FROM MEMORY
                             AT ADDRESS OF r2 TO r2 */
jr ra                     /* FINISH FUNCTION AND RETURN TO
                             CALL ORIGINAL */
nop                       /* nop FOR DELAY BRANCHING */
```

FIG. 8

```
int hw(int para){
    volatile int *p = (int*)0x1000;
    int ret;
    __order(*p = para;
            ret = *p,
            3);
    return ret;
}
```

FIG. 9

```
int ary[4][4];   /* 4×4 TWO-DIMENSIONAL ARRAY */
void sample(int para, int x, int y){
    volatile int *p=(int*)0x1000;
    int ret;
    __order(*p = para;
            ret = *p,
            3);
    ary[x][y]=ret;   /* INPUT OPERATION RESULT TO ary[x][y] */
}
```

FIG. 10

```
addiu r2, r0, 0x1000      /* INPUT VALUE AT 0x1000 TO r2 */
sw r4, 0(r2)              /* WRITE r4 (para IN SOURCE PROGRAM)
                             TO MEMORY AT ADDRESS OF r2 */
nop
nop
nop
lw r7, 0(r2)              /* INPUT CONTENT READ FROM MEMORY
                             AT ADDRESS OF r2 TO r7 */
sll r4, r6, 2             /* SHIFT r6 (y IN SOURCE PROGRAM)LEFT BY 2 AND
                             INPUT r6 TO r4 (EQUIVALENT TO FOURFOLD) */
sll r8, r5, 4             /* SHIFT r5 (x IN SOURCE PROGRAM)LEFT BY 4 AND
                             INPUT r5 TO r8 (EQUIVALENT TO SIXTEENFOLD) */
addiu r3, gp, sdaoff(_ary) /* ADD REGISTERS gp AND sdaoff(_ary) AND
                             INPUT LEADING ADDRESS OF _ary TO r3 */
addu r2, r3, r8           /* ADD r3 AND r8 AND INPUT ADDITION RESULT TO r2,
                             ADDRESS OF ary[x][0] IS CALCULATED */
addu r2, r2, r4           /* ADD r2 AND r4 AND INPUT ADDITION RESULT TO r2,
                             ADDRESS OF ary[x][y] IS CALCULATED */
sw r7, 0(r2)              /* INPUT r7 TO MEMORY (ary[x][y]) AT ADDRESS OF r2 */
jr ra                     /* FINISH FUNCTION AND RETURN TO CALL ORIGINAL */
nop                       /* nop FOR DELAY BRANCHING */
```

FIG. 11

```
addiu r2, r0, 0x1000
sw r4, 0(r2)
sll r4, r6, 2
sll r8, r5, 4
addiu r3, gp, sdaoff(_ary)
lw r7, 0(r2)
addu r2, r3, r8
addu r2, r2, r4
sw r7, 0(r2)
jr ra
nop
```

FIG. 12

```
int ary[4][4];
void sample(int para, int x, int y) {
    volatile int *p = (int*)0x1000;
    int ret;
    int *ap;
    *p = para;
    ap = &ary[x][y];    /* OBTAIN ADDRESS OF ary[x][y] AND INPUT
                           OBTAINED ADDRESS TO ap */
    ret = *p;
    *ap = ret;          /* INPUT OPERATION RESULT TO MEMORY AT
                           ADDRESS OF AP */
}
```

FIG. 13

```
int hw(int para){
    volatile int *p=(int*)HARD_REG_ADDRESS;
int ret;

#pragma order{
    *p=para;
#pragma order3
    ret=*p;
#pragma order}
    return ret;
    }
```

```
int hw(int para){
    int ret;
    ctc2(2, para);  /* WRITE PARAMETER TO REGISTER 2 OF COPROCESSOR */
    cop2(1);        /* PERFORM COPROCESSOR OPERATION (FUNCTION NUMBER 1)*/
    nop();
    nop();
    nop();
    cfc2(ret, 1)    /* READ OPERATION RESULT FROM REGISTER 1
                         OF COPROCESSOR */
    return ret;     /* SET OPERATION RESULT AS RETURN VALUE */
}
```

FIG. 17

```
int hw(int para){
    int ret;
    ctc2(2, para);  /* WRITE PARAMETER TO REGISTER 2 OF COPROCESSOR */
    __order(cop2(1),/* PERFORM COPROCESSOR OPERATION (FUNCTION NUMBER 1)*/
            cfc2(ret, 1), /* READ OPERATION RESULT FROM REGISTER 1
                             OF COPROCESSOR */
            3);
    return ret;     /* SET OPERATION RESULT AS RETURN VALUE */
}
```

FIG. 18

```
ctc2 r4, 2      /* WRITE r4 (para IN SOURCE PROGRAM) TO REGISTER 2
                     OF COPROCESSOR */
cop2(1);        /* PERFORM COPROCESSOR OPERATION (FUNCTION NUMBER 1)*/
nop
nop
nop
nop
cfc2 r2, 1      /* RECEIVE OPERATION RESULT FROM REGISTER 1 OF
                     COPROCESSOR AND INPUT OPERATION RESULT TO r2 */
jr   ra         /* FINISH FUNCTION AND RETURN TO CALL ORIGINAL */
nop             /* nop FOR DELAY BRANDHING */
```

FIG. 19

```
int ary[4][4];   /* 4×4 TWO-DIMENSIONAL ARRAY */
void hw(int para, int x, int y) {
    int ret;
    ctc2(2, para);
    __order(cop2(1),
            cfc2(ret, 1),
            3);
    ary[x][y]=ret;   /* INPUT OPERATION RESULT TO ary[x][y] */
}
```

F I G. 20

```
ctc2 r4, 2               /* WRITE r4 (para IN SOURCE PROGRAM) TO REGISTER 2
                            OF COPROCESSOR */
cop2(1)                  /* PERFORM COPROCESSOR OPERATION (FUNCTION NUMBER 1)*/
sll r4, r6, 2            /* SHIFT r6 (y IN SOURCE PROGRAM)LEFT BY 2 AND
                            INPUT r6 TO r4 (EQUIVALENT TO FOURFOLD) */
sll r8, r5, 4            /* SHIFT r5 (x IN SOURCE PROGRAM)LEFT BY 4 AND
                            INPUT r5 TO r8 (EQUIVALENT TO SIXTEENFOLD) */
addiu r3, gp, sdaoff(__ary)  /* ADD REGISTERS gp AND sdaoff(__ary) TO THEREBY
                                INPUT LEADING ADDRESS OF __ary TO r3 */
cfc2 r7, 1               /* RECEIVE OPERATION RESULT FROM REGISTER 1 OF
                            COPROCESSOR AND INPUT OPERATION RESULT TO r2 */
addu r2, r3, r8          /* ADD r3 AND r8 AND INPUT ADDITION RESULT TO r2,
                            ADDRESS OF ary[x][0] IS CALCULATED */
addu r2, r2, r4          /* ADD r2 AND r4 AND INPUT ADDITION RESULT TO r2,
                            ADDRESS OF ary[x][y] IS CALCULATED */
sw r7, 0(r2)             /* INPUT r7 TO MEMORY (ary[x][y]) AT ADDRESS OF r2 */
jr ra                    /* FINISH FUNCTION AND RETURN TO CALL ORIGINAL */
nop                      /* nop FOR DELAY BRANCHING */
```

F I G. 21

```
int mul255(int a, int b) {
    int c;
    c = a * b;
    if(c >= 256)
        c = 256;
    return c;
} int ary[255][2];   /* 256×2 TWO-DIMENSIONAL ARRAY */
void test(){
    int i;

for(i=0;i<256;++i){
        ary[i][0]=mul255(i, 3);   /* INPUT OPERATION RESULT OF mul255(i, 3)
                                     TO ary[i][0] */
        ary[i][1]=mul255(i, 5);   /* INPUT OPERATION RESULT OF mul255(i, 5)
                                     TO ary[i][1] */
    }
}
```

F I G. 22

```
int mul255(int a, int b) {
    int c;
    int *p1=(volatile int *)0x1000;
    int *p2=(volatile int *)0x1004;

*p2=b;
    __order(*p1=a,
            c=*p1,
            3);
    return c;
}
```

F I G. 23

```
addiu r3, r0, 0x1000      /* INPUT VALUE AT 0x1000 TO r3 */
addiu r2, r0, 0x1004      /* INPUT VALUE AT 0x1004 TO r2 */
sw  r5, 0(r2)             /* WRITE r5 (b IN SOURCE PROGRAM)
                             TO MEMORY AT ADDRESS OF r2 */
sw  r4, 0(r3)             /* WRITE r4 (a IN SOURCE PROGRAM)
                             TO MEMORY AT ADDRESS OF r3 */
nop
nop
nop
lw  r2, 0(r3)             /* INPUT CONTENT READ FROM MEMORY
                             AT ADDRESS OF r3 TO r2 */
jr  ra                    /* FINISH FUNCTION AND RETURN TO
                             CALL ORIGINAL */
nop                       /* nop FOR DELAY BRANCHING */
```

FIG. 24

```
inline int mul255(int a, int b) {
    int c;
    int *p1=(volatile int *)0x1000;
    int *p2=(volatile int *)0x1004;

*p2=b;
    __order(*p1=a,
            c=*p1,
            3);
    return c;
}
```

FIG. 25

```
addu  r2, r0, r0              /* SET r2 (i IN SOURCE PROGRAM) AT 0 */
L2:
addiu r6, r0, 3               /* INPUT 3 TO r6 */
addiu r5, r0, 0x1000          /* INPUT 0x1000 TO r5 (p1 IN SOURCE PROGRAM) */
addiu r4, r0, 0x1004          /* INPUT 0x1004 TO r4 (p2 IN SOURCE PROGRAM) */
sw    r6, 0(r4)               /* WRITE r6 TO MEMORY AT ADDRESS OF r4 */
sw    r2, 0(r5)               /* WRITE r2 (i IN SOURCE PROGRAM) TO
                                 MEMORY AT ADDRESS OF r5, START OPERATION */
sll   r3, r2, 3               /* SHIFT r2 (i IN SOURCE PROGRAM) LEFT BY 3 AND
                                 INPUT r2 TO r3, EQUIVALENT TO EIGHTFOLD */
addiu r6, gp, sdaoff(__ary)   /* ADD REGISTER gp AND sdaoff(__ary) TO
                                 THEREBY INPUT ADDRESS OF __ary[0][0] TO r6 */
addu  r3, r6, r3              /* ADD r3 AND r6 AND INPUT ADDITION RESULT TO r3,
                                 ADDRESS OF ary[i][0] IS CALCULATED */
lw    r1, 0(r5)               /* INPUT CONTENT READ FROM MEMORY AT ADDRESS
                                 OF r5 TO r1, RECEIVE OPERATION RESULT */
addiu r6, r0, 5               /* INPUT 5 TO r6 */
sw    r1, 0(r3)               /* WRITE r1 TO MEMORY (ary[i][0] AT ADDRESS OF r3 */
sw    r6, 0(r4)               /* WRITE r6 TO MEMORY AT ADDRESS OF r4 */
sw    r2, 0(r5)               /* WRITE r2 (i IN SOURCE PROGRAM) TO MEMORY
                                 AT ADDRESS OF r5, START OPERATION */
sll   r3, r2, 3               /* SHIFT r2 (i IN SOURCE PROGRAM) LEFT BY 3 AND
                                 INPUT r2 TO r3, EQUIVALENT TO EIGHTFOLD */
addiu r6, gp, sdaoff(__ary+4) /* ADD REGISTER gp AND sdaoff(__ary+4) TO
                                 THEREBY INPUT ADDRESS OF __ary[0][1] TO r6 */
addu  r3, r6, r3              /* ADD r3 AND r6 AND INPUT ADDITION RESULT TO r3,
                                 ADDRESS OF __ary[i][1] IS CALCULATED */
lw    r1, 0(r5)               /* INPUT CONTENT READ FROM MEMORY AT ADDRESS
                                 OF r5 TO r1, RECEIVE OPERATION RESULT */
addiu r2, r2, 1               /* ADD 1 TO r2 (i IN SOURCE PROGRAM) */
sw    r1, 0(r3)               /* WRITE r1 TO MEMORY (ary[i][1] AT ADDRESS OF r3 */
slti  r3, r2, 256             /* COMPARE r2 (i IN SOURCE PROGRAM) WITH 256 */
bne   r3, r0, L2              /* IF r2 IS LESS THAN 256, BRANCH TO LABEL L2 */
nop                           /* nop FOR DELAY BRANCHING */
jr    ra                      /* FINISH FUNCTION AND RETURN TO CALL ORIGINAL */
nop                           /* nop FOR DELAY BRANCHING */
```

FIG. 26

```
mul r1, r2      /* MULTIPLY r1 BY r2 AND INPUT MULTIPLICATION
                   RESULT TO HI, LO REGISTERS */
<op-1>
<op-2>
<op-3>
mflo r3         /* ASSIGN MULTIPLICATION RESULT LO REGISTER TO r3 */
```

FIG. 27
(PRIOR ART)

```
sw r4, 0(r2)    /* SET OPERATION PARAMETER AND START OPERATION */
nop
nop
nop
lw r4, 0(r2)    /* RECEIVE OPERATION RESULT 4 CLOCK AFTER OPERATION */
```

FIG. 28
(PRIOR ART)

COMPILER, OPERATION PROCESSING SYSTEM AND OPERATION PROCESSING METHOD

CROSS REFERENCE TO RELATED APPLICATIONS

This application is based upon and claims the benefit of priority from the prior Japanese Patent Application No. 2002-190818, filed on Jun. 28, 2002, the entire contents of which are incorporated herein by reference.

BACKGROUND OF THE INVENTION

1. Field of the Invention

The present invention relates to a compiler and an operation processing method for generating an object code based on a source program represented by a high-level language, and to an operation processing system which performs an operation processing based on an object code generated by a compiler of this type.

2. Related Background Art

If a processing which is not completed in one cycle is performed by a processor, even a compiler can easily schedule the execution of the processor if an instruction for starting processings and an instruction for receiving the processing result are a combination of specific dedicated instructions.

For instance, if 4 cycles of a system clock are required to execute an mul instruction to perform multiplication and an mflo instruction to receive lower 32 bits of the multiplication result (note that the mul instruction and the mflo instruction are MIPS architecture instructions as one example of an RISC type processor and that an assembly instruction in this specification employs instructions of the MIPS architecture), three irrelevant instructions are input between the mul instruction and the mflo instruction as shown in FIG. 27 to enable performing a processing without causing stall.

In FIG. 27, if a predetermined rule in which three instructions between the mul instruction and the mflo instruction are the instructions for not accessing an HI register and an LO register and not using a register defined by the mflo instruction is incorporated into the compiler, not only in the case that the compiler generates the mul instruction and the mflo instruction, but in the case that a programmer describes the mul instruction and the mflo instruction by a bulit-in-function (intrinsics function), it is possible to perform instruction scheduling by the compiler. The intrinsic function is a method of describing a machine instruction which the compiler cannot directly generate, in the source of C language in a function form.

However, if an operation unit which is connected to a processor performs an arithmetic operation, the used instructions are not special instructions but ordinary instructions (e.g., an sw instruction and an lw instruction) to access the operation unit and peripherals connected to the processor. Because of this, a scheduling method conducted by a combination of special instructions such as the mul instruction and the mflo instruction stated above cannot deal with the operation unit.

For instance, if the operation unit performs an operation in accordance with a content written to the register of the operation unit by an sw instruction and reads an operation result from the register by an lw instruction 4 cycles after performing the operation, then instructions are described as shown in FIG. 28. It is assumed herein that a register r2 already stores the address of the register of the operation unit.

Both the sw instruction and the lw instruction are instructions used for ordinary memory access. Therefore, the same scheduling rules as those which is a combination of specific instructions such as the mul instruction and the mflo instruction cannot be incorporated into the compiler. Because of this, if the sw instruction and the lw instruction are to be executed, it is necessary for a programmer to describe a program while taking account of scheduling.

SUMMARY OF THE INVENTION

A compiler according to an embodiment of the present invention which generates object codes based on a source program, comprising:

an instruction detection section which detects instruction scheduling information described in said source program, the instruction scheduling information describing first and second operation instruction information and the number of cycles or the number of instructions to be secured between the object code corresponding to said first operation instruction information and the object code corresponding to said second operation instruction information; and an object code insertion section inserting an object code irrelevant to the object code corresponding to said first operation instruction information and the object code corresponding to the second operation instruction, between the object code corresponding to said first operation instruction information and the object code corresponding to the second operation instruction, by as much as said number of cycles or number of instructions.

Furthermore, an operation processing system according to an embodiment of the present invention which performs an operation processing in accordance with object codes generated based on a source program, comprising:

an operation processing section which performs operation processing, based on first and second operation instruction information and the number of cycles or the number of instructions to be secured between the object code corresponding to said first operation instruction information and the object code corresponding to said second operation instruction information, between the object code corresponding to said first operation instruction information and the object code corresponding to said second operation instruction information, based on a group of the object codes which are consisted of another object code which does not use a hardware resource used by the object code corresponding to said first operation instruction information and the object code corresponding to said second operation instruction information but which uses another hardware resource between the object code corresponding to said first operation instruction information and the object code corresponding to said second operation instruction information inserted by as much as said number of cycles or number of instructions.

BRIEF DESCRIPTION OF THE DRAWINGS

FIG. 5 is a view showing one example of a source program in C language;

FIG. 6 is a view showing object codes corresponding to the source program shown in FIG. 5;

FIG. 7 is a view showing one example of adding nop( ) to the source program shown in FIG. 5;

FIG. 8 is a view showing object codes corresponding to the source program shown in FIG. 7;

FIG. 9 is a view showing a source program obtained by rewriting the source program shown in FIG. 7 using __order;

FIG. 10 is a view showing one example of a source program if the other statement ary[x][y]=ret exists near the expression __order;

FIG. 11 is a view showing object codes which show the compilation result of the source program shown in FIG. 10;

FIG. 12 is a view showing that instruction strings in a part of the object codes shown in FIG. 11 are reordered;

FIG. 13 is a view showing that a programmer modifies the description of a source program;

FIG. 17 is a view showing one example of a source program if a coprocessor performs operation;

FIG. 18 is a view showing one example of rewriting the source program shown in FIG. 17 using __order;

FIG. 19 is a view showing object codes compiled from the source program shown in FIG. 18;

FIG. 20 is a view showing a program for inputting an operation result to an array ary[x][y];

FIG. 21 is a view showing the compilation result of FIG. 20;

FIG. 22 is a view showing one example of a source program in which a function mul255 is described;

FIG. 23 is a view showing one example of describing the function mul255 using __order;

FIG. 24 is a view showing the compilation result of the source program shown in FIG. 23;

FIG. 25 is a view showing one example of describing the function mul255 as an inline function;

FIG. 26 is a view showing the compilation result of the inline function shown in FIG. 25;

FIG. 27 is a view showing one example of object codes in which three irrelevant instructions are inserted between an mul instruction and an mflo instruction; and FIG. 28 is a view showing one example of object codes in which three nop instructions are inserted between an sw instruction and an lw instruction.

DESCRIPTION OF THE PREFERRED EMBODIMENTS

A compiler, an operation processing system and an operation processing method according to the present invention will be more specifically described hereinafter with reference to the drawings.

Figures 1, 2:
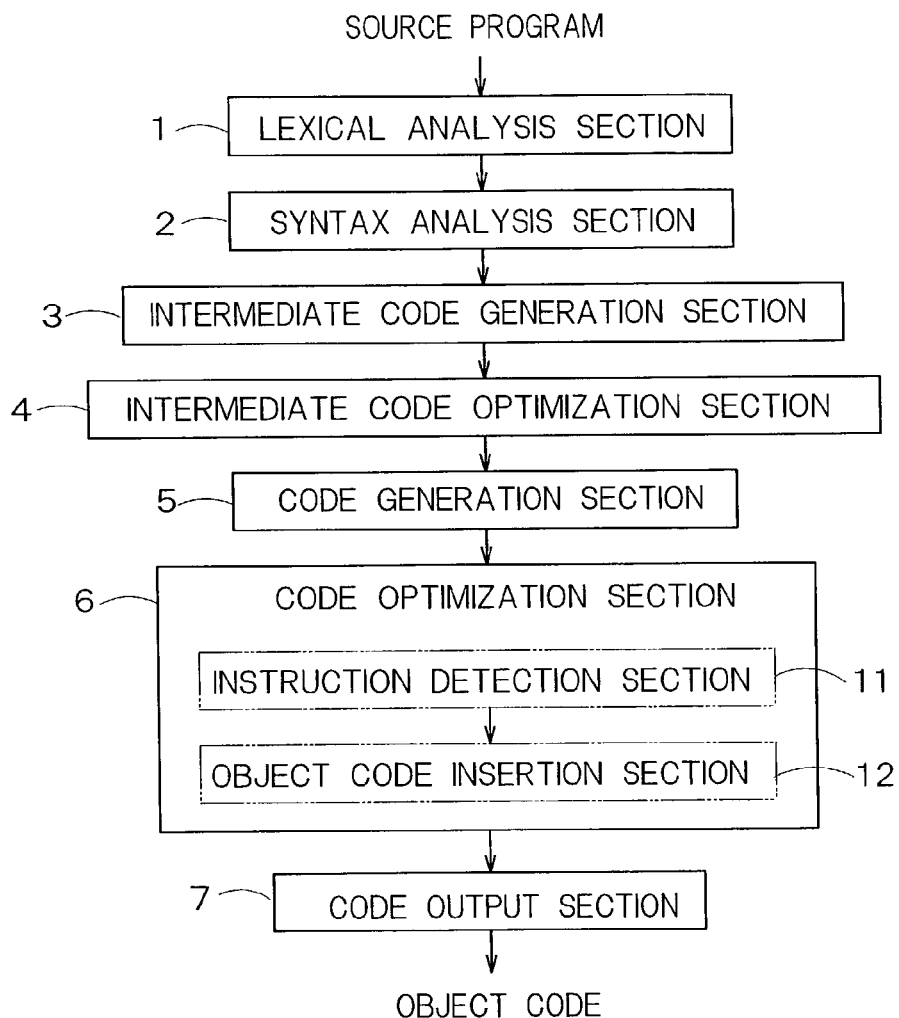
FIG. 1 is a block diagram showing the schematic configuration of one embodiment of a compiler according to the present invention.
FIG. 2 is a view showing one example of a source program in C language.

FIG. 1 is a block diagram showing schematic configuration of one embodiment of the compiler according to the present invention. The compiler shown in FIG. 1 is a program which is read to and executed by a computer equipment such as a personal computer, and converts a source program, which is given from a user and described in C language or the like, to object codes which a processor can execute. It is also possible to implement the compiler by a hardware. In the latter case, the compiler may be built in the same chip as that of a processor or may be built in a different chip from that of the processor.

The compiler shown in FIG. 1 has a lexical analysis section 1, a syntax analysis section 2, an intermediate code generation section 3, an intermediate code optimization section 4, a code generation section 5, a code optimization section 6 and a code output section 7.

The lexical analysis section 1 divides the source program to tokens which are meaningful lexical units. In case of the source program in C language shown in FIG. 2, for example, "void", "x", "(", ")", "{", "int", "a", ";", "}" are tokens.

The syntax analysis section 2 checks whether or not each divided token is described in accordance with a grammar specified in the language of the source program. This syntax analysis section 2 also checks whether or not each factor of a function is correctly described.

The intermediate code generation section 3 generates an intermediate code which is higher in level than an assembly language and lower in level than a high-level language. The intermediate code optimization section 4 optimizes the operation of constants such as 1+1.

Object codes are not directly generated from the source program but the source program is temporarily converted to intermediate codes. This is because even if different high-level languages are used, it is possible to use the same intermediate code in common and the processings after the intermediate code is generated until the object code is generated are performed in common in a plurality of high-level language. Therefore, if an instruction optimization processing is performed at the stage of the intermediate codes, it becomes unnecessary to develop separate optimization processings for the respective high-level languages.

The code generation section 5 generates object codes based on the result of the syntax analysis. The code optimization section 6 optimizes the generated object codes. As shown in FIG. 1, the code optimization section 6 includes an instruction detection section 11 and an object code insertion section 12.

The instruction detection section 11 detects whether or not a specific function to be explained later is included in the source program. The object code insertion section 12 moves a part of the object codes or inserts an nop code into the object codes based on the factors of the detected specific function, and generates final object codes. The generated object codes are output from the code output section 7.

Figure 3:
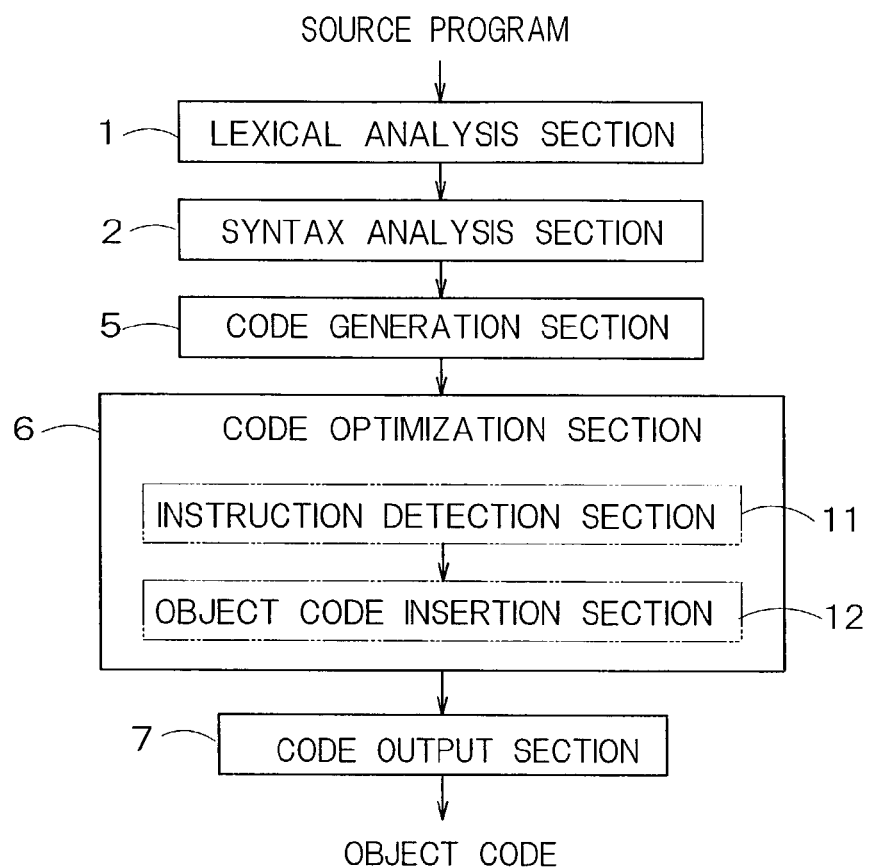
FIG. 3 is a block diagram showing the schematic configuration of one embodiment of a compiler which does not generate an intermediate code.

Alternatively, the object codes may be directly generated from the source program without generating intermediate codes. The block diagram in this case is shown in FIG. 3. In this case, the intermediate code generation section 3 and the intermediate code optimization section 4 are unnecessary.

Figure 4:
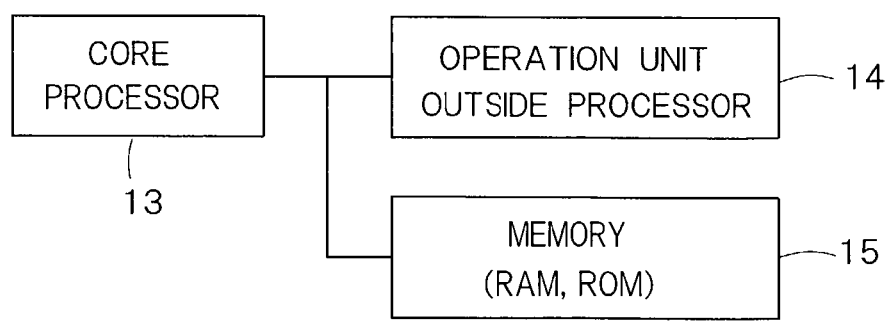
FIG. 4 is a block diagram showing the schematic configuration of a processor system which performs operation processing based on object codes generated by the compiler shown in FIG. 1.

FIG. 4 is a block diagram showing schematic configuration of a processor system which performs an operation processing based on the object codes generated by the compiler shown in FIG. 1. As shown in FIG. 4, the processor system includes a core processor 13 which performs a main operation processing, an operation unit outside processor 14 which performs an operation processing separately from the core processor 13, and a memory 15 from and to which the core processor 13 and the operation unit outside processor 14 can read and write data.

A method for using the compiler in this embodiment will be described hereinafter. First, as a simple example, a case where data is written to the register of the operation unit outside processor 14 connected to the core processor 13 in response to an sw instruction to start operation and an operation result is read from the register of the operation unit outside processor 14 in response to an lw instruction will be described. It is assumed herein that the register of the operation unit outside processor 14 has an inherent address on the memory space of the core processor 13.

It is assumed, for example, that a value is written to the register (address 0x1000) of the operation unit outside processor 14, an operation for obtaining the square of this value is started and that the operation result is set in the register (address 0x1000). If the operation result is described by C language, a source program as shown in FIG. 5 is obtained.

If the source program shown in FIG. 5 is compiled by the predetermined processor 13, object codes as shown in FIG. 6 are obtained. In FIG. 6, ojbect codes are expressed by an assembly language.

In FIG. 6, with addiu r2, r0, 0x1000, r0+0x1000 is input to a register r2. A register r0 is always 0. With sw r4, 0(r2), the value of a register r4 (para in the source program) is written to the memory 15 at the address of the register r2. With lwr2, 0(r2), the content read from the memory 15 at the address of the register r2 is input to the register r2. With jr ra, the function is finished and the processing returns to a call original.

If the operation of the operation unit outside processor 14 is finished in 1 cycle, the object codes shown in FIG. 6 may be used without causing any problem. However, if the above-stated operation always requires 4 cycles and it is necessary to leave a space of 3 cycles (3 instructions if the number of cycles for executing one instruction is 1) between the sw instruction and lw instruction, then it is necessary to describe nop( ) in the source program as shown in FIG. 7.

The nop( ) shown in FIG. 7 describes an nop instruction by the intrinsics function. If the source program shown in FIG. 7 is compiled, three nop instructions are arranged between the sw instruction and the lw instruction as shown in FIG. 8.

To obtain the object codes shown in FIG. 8, it is required to describe the source program as shown in FIG. 7 while a programmer takes into consideration the processing scheduling of the core processor 13, which imposes heavy burden on the programmer.

This embodiment is characterized in that instruction scheduling information is described in a source program in a specific function form (e.g., _order) to allow the compiler to make scheduling. If the source program shown in FIG. 7 is rewritten using the specific function form _order, a source program as shown in FIG. 9 is obtained.

If the source program shown in FIG. 9 is compiled, the same compilation result as that shown in FIG. 8 is obtained.

In FIG. 9, _order is a reserved word which is independently added for instruction scheduling. While _order is used as a specific function form in this embodiment, an arbitrary phrase other than reserved words specified under the ISO/IEC C language standard can be used.

_order is described in the form of a function call. More specifically, _order has three factors. A scheduling target expression is described in each of the first and second factors and the necessary number of cycles to be secured between the object codes generated from the first and second factors is described by the third factor. That is, first operation instruction information is described by the first factor, second operation instruction information is described by the second factor and the number of cycles to be secured between the object code corresponding to the first operation instruction information and the object code corresponding to the second operation instruction information is described by the third factor.

In the object codes obtained by compiling the source program shown in FIG. 9, nop instructions are arranged between the sw instruction and the lw instruction. These nop instructions are automatically inserted by the compiler. Because of this, it is unnecessary for the programmer to describe the nop instructions in the source program in advance, thereby making it possible lessen program development burden imposed on the programmer.

Further, if another statement is present near the expression _order in the source program, an instruction which is movable and irrespective of the sw instruction and the lw instruction, other than the nop instructions, is inserted between the sw instruction and the lw instruction. By doing so, it is possible to enhance performance for the execution of the generated object codes and to decrease code size.

Thus, if there is the expression_order in the source program, an object code which is irrespective of the object code corresponding to the first factor of the expression _order and the object code corresponding to the second factor thereof is inserted between these two object codes by as much as the number of cycles designated by the third factor. For example, the other object code, which does not use hardware resources used by the object code corresponding to the first factor and by the object code corresponding to the second factor but use other hardware resources, is inserted between these object codes by as much as the number of cycles designated by the third factor.

FIG. 10 shows one example of a source program in the case where the other statement ary[x][y]=ret is present near the expression_order. The source program shown in FIG. 10 is to input an operation result to an array ary[x][y]. If this source program is compiled and the nop instructions are inserted between the sw instruction and the lw instruction, then object codes as a compilation result as shown in FIG. 11 are obtained.

In FIG. 11, as the compilation result of the statement array [x][y]=ret, instructions "lw r7, 0(r2)", "sllr4, r6, 2", "sllr8, r5, 4", "addiu r3, gp,sdaoff(_ary)", "addu r2, r3, r8" and "addu r2, r2, r4" are obtained. With the instruction "lwr7, 0(r2)", the content read from the memory 15 at the address of the register r2 is inputted to a register r7. With the instruction "sllr4, r6, 2", a register r6 which stores y in the source program shown in FIG. 10 is shifted left by 2 bits and input to a register r4 , i.e., y is multiplied by 4. With the instruction "sllr8, r5, 4", a register r5 which stores x in the source program is shifted left by 4 bits and inputted to a register r8 , i.e., x is multiplied by 16. With the instruction "addiu r3, gp,sdaoff(_ary)", the values of registers gp and sdaoff(_ary) are added together and the leading address of _ary is inputted to a register r3 . With the instruction "addu r2, r3, r8", the values of registers r3 and r8 are added together and the addition result is inputted to the register r2. As a result, the address of ary[x][0] is calculated. With the instruction "addu r2, r2, r4", the values of registers r2 and r4 are added together and the addition result is inputted to the register r2. As a result, the address of ary[x][y] is calculated.

Among these instruction strings, the instructions "sll r4, r6, 2" and "sll r8, r5, 4" can be executed irrespective of an operation processing by the instruction "lwr7, 0(r2)". Therefore, the compiler in this embodiment reorders a part of the instruction strings of the object codes shown in FIG. 11 and generates an object code shown in FIG. 12. In FIG. 12, the instructions "sll r4, r6, 2", "sll r8, r5, 4" and "addiu r3, gp,sdaoff(__ary)" are arranged between "sw r4, 0 (r2)" and "lw r7, 0(r2)".

While the object codes shown in FIG. 11 consist of 14 instructions, the object codes shown in FIG. 12 consist of 11 instructions.

Thus, according to the compiler in this embodiment, if an irrelevant statement is present near the expression __order, this irrelevant statement is inserted instead of the nop instructions. Due to this, performance for the execution of the generated object codes can be enhanced and the number of instructions can be decreased, making it possible to decrease code size.

On the other hand, if the programmer schedules instructions in a source program in C language or the like, it is necessary to modify the description of the source program as shown in FIG. 13. In FIG. 13, with "*p=para", after para is input to the memory 15, ap=&ary[x][y] is inserted to obtain the address of ary [x][y] and the obtained address is inputted to ap.

As shown in FIG. 13, if the programmer himself or herself modifies the description of the source program, burden on the programmer increases. Further, if instructions are scheduled in the source program, an expected object code cannot be often generated by the optimization processing of the compiler.

In this embodiment, the programmer does not modify the source program but only gives scheduling information on instructions to the compiler. Based on this scheduling information, the compiler finds an irrelevant and movable instruction, and inserts the found instruction between two designated operation instructions. In addition, the compiler inserts nop instructions only if the irrelevant and movable instructions cannot be found by as much as the necessary number of cycles.

The compiler shown in FIG. 1 performs the following processings if the above-stated specific function __order is found in the source program. The lexical analysis section 1 recognizes __order as a reserved word. The syntax analysis section 2 first checks the description contents of the respective factors of the function__order to check whether or not the first and second factors are meaningful expressions. For instance, if constants are described in the first and second factors as seen __order(1,2,3), no instructions to be scheduled are generated and the syntax analysis section 2 determines that there is an error in. The syntax analysis section 2 also checks whether or not the third factor is a positive integer constant. If a variable other than constants is described in the third factor, the value is unknown during compilation. Therefore, the syntax analysis section 2 determines that there is an error.

If intermediate codes are to be generated, the intermediate code generation section 3 generates an ordinary intermediate code which is generated from the expressions of the first and second factors, an intermediate code which serves as a mark which indicates that an object code is described by the function __order before or after the first intermediate code, and an intermediate code which indicates a value designated by the third factor of the function __order.

The code generation section 5 generates an object code based on the first and second factors of the function __order. Although the intermediate code which serves as a mark for indicating that the code is generated by the function __order and the intermediate code indicating the value of the third factor are not converted to object codes, they are stored as data related to the object code which is generated based on the first and second factors.

The code optimization section 6 schedules instructions based on the mark indicating that the code is generated by the function __order and on the third factor.

Figure 14:
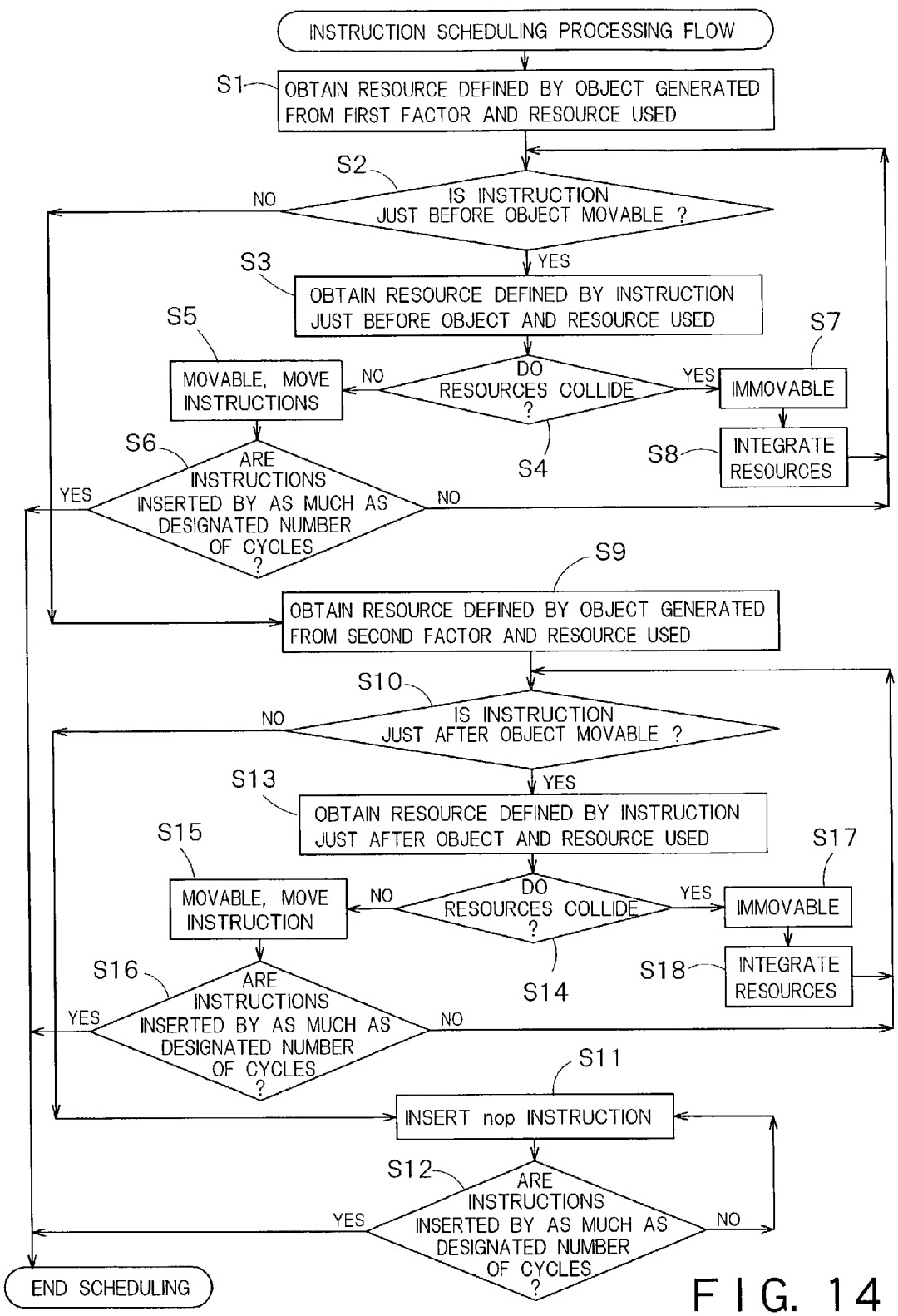
FIG. 14 is a flowchart showing one example of the processing procedures of a code optimization section 6.

FIG. 14 is a flowchart showing one example of the processing procedures of the code optimization section 6. First, a resource (e.g., register or memory 15) d1 defined by the object code generated from the first factor of the function __order and a resource u1 used for operation are obtained (in a step S1). In the case of FIG. 12, for example, the object code generated from the first factor is "sw r4, 0(r2)". The resource d1 defined by this instruction is the memory 15 and the resource u1 used for operation is "r4, r2".

The code optimization section 6 determines whether or not the instruction which is arranged just before the object code generated from the first factor of the function __order is movable to a difference location (in a step S2). If the instruction is an immovable instruction such as a branch instruction, the instruction cannot be moved from the front of the function __order. Therefore, the code optimization section 6 proceeds to a processing for moving an instruction from the rear of the object code generated from the second factor.

If the instruction arranged just before the object code generated from the first factor is movable, a resource d2 defined by this instruction and a resource u2 used for operation are obtained (in a step S3). In FIG. 12, the instruction just before the object code generated from the first factor is "addiu r2, r0, 0 x10000", the resource d2 defined by this instruction is r2, and no resource is used for operation. Since r0 is a register which is always 0 and 0x10000 is a constant operand, they are not regarded as resources.

Next, the code optimization section 6 determines whether or not the resources d2 and u2 related to the instruction arranged just before the object code generated from the first factor collides against the resources d1 and u1 of the object code generated from the first factor (in a step S4). If the resources do not collide against one another, it is determined that the instruction is movable.

The conditions that the resources do not collide against one another are that the logical product between d2 and the logical add between d1 and u1 , i.e. ((d1|u1)&d2), is a null and that the logical product between d1 and u2 , i.e. (d1&u2), is a null. In the case of FIG. 12, the resources u1 and d2 are both r2 and collide against each other, so that the instruction cannot be moved.

If it is determined that the instruction is movable, the instruction arranged just before the object code is moved between the object code generated from the first factor and that generated from the second factor (in a step S5). If instructions are moved by as much as the designated number of cycles as a result of the movement of this instruction, the scheduling is finished. If instructions are not moved by as much as the number of cycles designated by the third factor, it is checked whether an instruction can be moved further forward (in a step S6).

If it is determined that the resources collide against one another in the step S4, it is determined that the instruction is immovable (in a step S7) and the set of resources are subjected to logical add(in a step S8). The defined resource is integrated into d1 (d1=d1|d2 ) and the used resources are integrated into u1 (u1=u1|u2 ). By doing so, while the resources d1 and u1 are moved, they become the resource of a certain instruction. Because of this, it suffices to check only the resources d1 and u1 even in the case where it is determined whether or not the next instruction just arranged before the object code is movable.

As a result of integrating the resources in FIG. 12, the defined resource d1 becomes the register r2 and the memory 15 and the used resource u1 becomes the registers r4 and r2. If the processing in the step S8 is finished, the code optimization section 6 performs processings after the step S2.

If it is determined that instructions by as much as the designated number of cycles cannot be inserted only by the instruction arranged before the object code generated from the first factor or that the instruction which is arranged just before the object code generated from the first factor of __order cannot be moved to a difference location, then an instruction which is arranged in rear of the object code generated from the second factor is to be scheduled. In FIG. 12, for example, no instruction is present just before the instruction addiu. Therefore, the instruction in rear of an object code group generated from the second factor is to be scheduled.

First, a resource d3 defined by the object code generated from the second factor and a resource u3 used for operation are obtained (in a step S9). In FIG. 12, since the object code generated from the second factor is "lw r7, 0(r2)", the defined resource d3 is the register r7 and the used resource u3 is the register r2. It is then determined whether or not the instruction just after the object code generated from the second factor is movable (in a step S10).

If the instruction is an immovable instruction such as a branch instruction, there remains no movable instruction and nop instructions are inserted by as much as the shortage of the number of cycles defined by the third factor (in steps S11 and S12), finishing this scheduling.

If the instruction arranged just after the object code generated from the second factor is movable, a resource d4 defined by this instruction and a resource u4 used for operation are obtained (in a step S13). In FIG. 12, the instruction just after the object code generated from the second factor is "sll r4, r6, 2", the defined resource d4 is r4, and the used resource u4 is r6 and the memory 15.

Next, it is determined whether or not the resources d4 and u4 related to the instruction arranged just before the object code generated from the second factor collide against the resources d3 and u3 of the object code generated from the first factor (in a step S14). If the resources do not collide against one another, it is determined that the instruction is movable.

The conditions that the resources do not collide against one another are that the logical product between d4 and the logical add between d3 and u3, i.e. ((d3|u3)&d4), is null and the logical product between d3 and u4, i.e. (d3&d4), is null. In FIG. 12, since there are no resources which collide against "lw r7, 0(r2)" and "sll r4, r6, 2","sll r4, r6, 2" is determined movable.

If it is determined that the instruction is movable, this instruction is moved between the object code generated from the first factor and that generated from the second factor (in a step S15). If instructions by as much as the designated number of cycles are moved as a result of the movement of this instruction, scheduling is finished. If instructions are not moved by as much as the number of cycles designated by the third factor, it is determined whether or not an instruction arranged further forward is movable (in a step S16).

If it is determined that the resources collide in the step S14, then it is determined that the instruction is immovable (in a step S17), a resource arbitration processing is performed (in a step S18) and processings after the step S10 are performed.

In the flow chart shown in FIG. 14, the movement of the instruction from the front of the first factor is conducted first. Alternatively, even if the movement of the instruction from the rear of the second factor is conducted first, the same optimization processing can be carried out.

The number of cycles of the third factor is normally defined as the number of cycles necessary from the end of the object code group generated from the first factor to the top of the object code group generated from the second factor. However, it is also possible that the number of cycles is defined as the number of cycles necessary from the end of the object code group generated from the first factor to the end of the object code group generated from the second factor as an external specification of this scheduling function. In this case, cycles are counted on the assumption that the last instructions of the both object code groups are to be scheduled.

If it is difficult to estimate the number of instruction cycles during compilation, the third factor may define the number of instructions instead of the number of cycles.

By packaging the processing procedures of the flow chart of FIG. 14 into the compiler, it is possible to perform instruction scheduling in the instruction form designated by the function __order.

As stated so far, according to the first embodiment, because the instructions are reordered so as to prevent the collision of resources based on the specific function, it becomes unnecessary to input nop instructions and it is possible to enhance the object code execution performance. Besides, the size of the object code can be decreased.

(Second Embodiment)

In the first embodiment, instruction scheduling is made based on the specific function (e.g., __order) described in the source program. It is also possible to schedule instructions by another description method.

A "#pragma" is one of preprocessing directives specified under the ISO/IEC C language standard and permitted to be independently expanded by a processing system. In the second embodiment, instruction scheduling is designated using "#pragma order" obtained by adding "order" after "#pragma".

Figures 15, 16:
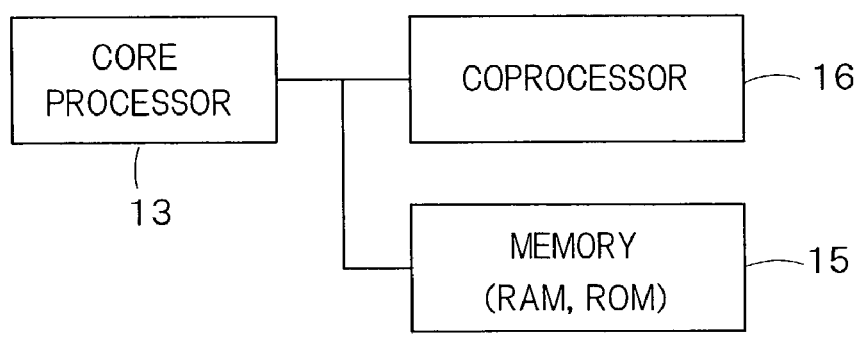
FIG. 15 is a view showing that the source program of FIG. 9 is rewritten using "#pragma order"
FIG. 16 is a block diagram showing one example of a processor system in which a coprocessor 16 and a memory 15 are connected to a core processor 13.

If the source program shown in FIG. 9 is rewritten using "#pragma order", the source program shown in FIG. 15 is obtained.

An expression which is put between "#pragma order {" and "#pragma order 3" is a first half expression and an expression which is put between "#pragma order 3" and "#pragma order}" is a second half expression. A constant value 3 indicated in "#pragma order 3" between the expressions shows the designation of the number of cycles to be inserted between the first half expression and the second half expression. If 4 cycles are necessary, "#pragma order 4" is described.

As can be seen from the first and second embodiments, additional information required to be described in the source program is first and second operation instruction information to be scheduled and the number of execution cycles which is to be inserted between the first and second operation instruction information. Any forms may be taken to realize these pieces of information.

The compiler shown in FIG. 1 processes "#pragma order" in the source program through the following procedures.

The lexical analysis section 1 divides the source program to tokens to find the expression "#pragma order". The syntax analysis section 2 checks the description content of the expression "#pragma order". First, the syntax analysis section 2 checks whether the expression is arranged in the order of {, constant,}. If the leading part of "#pragma order" is not described as "#pragma order {" or the definition of the function is finished halfway along {,constant,}, the expression is determined as an error. If "#pragma order" is used in a case other than the definition of the function, the expression is determined as an error. As for the constant, it is checked whether or not the constant is a positive integer constant.

The two expressions put between "#pragma order" are also checked if the syntax analysis section 2 can do so. If the syntax analysis section 2 cannot check the contents of the expressions because of the manner of packaging the compiler, they may be checked by the code generation section 5 provided in rear of the syntax analysis section 2. A check item is whether or not meaningful expressions to be scheduled are described. If the first half expression or the second half expression is not described or if an expression does not generate an object code because of the meaningless expression, then "#pragma order" is an error.

An intermediate code generated from "#pragma order" is added between an intermediate code generated from the first half expression of "#pragma order" and an intermediate code generated from the second half expression. The intermediate code generated from "#pragma order" means a mark for indicating that the code is generated from the first and second half expressions of "#pragma order" and a value indicating the number of cycles to be inserted.

At the stage of generating the intermediate codes, the codes are the same as those in the first embodiment. Because of this, the code generation section 5 and the code optimization section 6 are equal in configuration to those in the first embodiment.

Thus, according to the second embodiment, the number of cycles between object codes is designated using the preprocessing directive specified in a high-level language such as C language. Therefore, as in the case of describing object codes in a function form as described in the first embodiment, it is possible to enhance object code execution performance and to decrease object code size.

(Third Embodiment)

In the third embodiment, a coprocessor is employed as the operation unit outside processor shown in FIG. 4.

FIG. 16 is a block diagram showing one example of a processor system in which a coprocessor 16 and a memory 15 are connected to a core processor 13.

An instruction to access the register of the coprocessor 16 shown in FIG. 16 differs from a load instruction or a store instruction to access the memory 15. Because of this, it is sometimes possible for a compiler to automatically schedule instructions. However, if different operation cycles are used according to the types of operations of the compiler, it is normally difficult for the compiler to automatically schedule instructions.

In this embodiment, even in such a case, the compiler can make optimum instruction scheduling by programmer's designating the number of cycles according to the type of the operation of the coprocessor 16 in advance.

A source program shown in FIG. 17 is a conventional example in which the source program is described in C language using an intrinsic function while a CTC2 instruction is used to write data to the register of the coprocessor 16, a COP2 instruction is used to execute the operation of the coprocessor 16, and a CFC2 instruction is used to read the data of the register of the coprocessor 16.

In the source program shown in FIG. 17, an operation parameter is set to the register 2 of the coprocessor 16. If a parameter (function number) set by the COP2 instruction is 1, an operation is started. To be specific, for example, a value is read from the register 2 of the coprocessor 16, an operation is performed to obtain the square of the value, and the operation result is written to the register 1 of the coprocessor 16 4 cycles after the operation. In FIG. 17, it takes time for the coprocessor 16 to perform the operation, so that it is necessary to insert three nop instructions.

If this example is described using_order, the source program as shown in FIG. 18 is obtained.

If the source program shown in FIG. 18 is compiled, object codes shown in FIG. 19 are generated.

In an example shown in FIG. 19, since there are no irrelevant instructions to be inserted, four nop instructions are inserted.

An example of inserting irrelevant instructions will next be described. FIG. 20 shows a program for inputting an operation result to an array ary[x][y].

The result of compiling the program shown in FIG. 20 is that shown in FIG. 21. "ary[x][y]=ret" in FIG. 20 corresponds to five instructions shown in FIG. 21, i.e., "sll r4, r6, 2", "sll r8, r5, 4", "addiu r3, gp,sdaoff(_ary)", "addu r2, r3, r8" and "addu r2, r2, r4". Among them, the former three instructions are inserted between "cop2(1)" and "cfc2 r7, 1".

By doing so, it becomes unnecessary to insert the nop instructions as shown in FIG. 19, whereby performance for executing object codes to be generated is enhanced and code size can be decreased according to the decrease of the number of the nop instructions.

Thus, according to the third embodiment, even if an object code for instructing the coprocessor 16 to perform operation is generated, it is possible to enhance object code execution performance and to decrease object code size.

(Fourth Embodiment)

If a function which is used quite frequently in a certain application program, i.e., a function which has a high rate of occupying time for executing the overall program is changed from an operation which is performed in response to an ordinary instruction of a coprocessor 13 to an operation performed by a hardware, it is possible to enhance the performance of the overall application program.

FIG. 22 shows one example of a source program. In this source program, it is assumed that mul255 is a function used quite frequently. In this case, an operation unit outside processor which is a hardware realizing the function mul255 is connected to the coprocessor 13. An external specification if this operation unit executes an operation processing for the function mul255 is specified as follows.

The address of a register which sets a factor a of the function mul255 is 0x1000, the address of a register which sets a factor b is 0x1004, and the address of a register which receives an operation result is 0x1000.

If a value is written to the register at the address 0x1000, the operation unit outside processor multiplies a content which is already set to the register at the address 0x1004 by a content written to the register at the address 0x1000. If this multiplication result is not more than 255, the value is set to the register at the address 0x1000 as it is. If the multiplication result is not less than 256, 255 is set to the register at the address 0x1000. The number of cycles required for an operation since the value is written to the register at the address 0x1000 until the operation result is received from the register at the address 0x1000 is 4.

The programmer needs to modify the description of the function mul255 in accordance with the above-stated specification of the operation unit. If the function mul255 is described using __order, a source program shown in FIG. 23 is obtained.

However, if the content of the function is changed only to an instruction to access to the register as shown in FIG. 23, no irrelevant instructions are present before and after __order. Because of this, it is highly likely that nop instructions are inserted. If the source program shown in FIG. 23 is compiled, object codes shown in FIG. 24 are obtained. In FIG. 24, nop instructions are inserted, with the result execution performance deteriorates and code size increases.

To avoid inserting nop instructions, it is necessary to declare the function mul255 the description of which is changed as an inline function. With the inline function, the content of the function is developed not in the location of a function call but in a location in which the function is called. If so, the probability that irrelevant instructions are present before and after the developed function increases. As a result, the probability of inserting nop instructions into the source program using __order decreases. It is noted that the inline function is a feature which was added to C language under ISO/IEC 9899:1999 and not present under the previous specification of ISO/IEC 9899:1990.

If the above-stated function mul255 is described as an inline function, a source program shown in FIG. 25 is obtained. In this source program, "inline" which is a mark of the inline function is added to the top of the function mul255.

The result of compiling the source program while the inline function stated above is applied to a function "test" shown in FIG. 22, is shown in FIG. 26. In FIG. 26, three irrelevant instructions "sll r3, r2, 3", "addiu r6, gp,sdaoff (__ary) " and "addu r3, r6, r3" are inserted between "sw r2, 0(r5)" and "lw r1, 0(r5)" and three irrelevant instructions "sll r3, r2, 3" "addiu r6, gp, sdaoff(__ary+4)" and "addu r3, r6, r3" are inserted between "sw r2, 0(r5)" and "lw r1, 0(r5 )". As a result, there is no need to insert nop instructions.

Thus, according to the fourth embodiment, the function which controls the operation unit (operation unit outside processor 14) different from the core processor 13 is designated as the inline function, thereby the probability that irrelevant instructions are present around the developed function becomes high. Therefore, as in the case of the first to third embodiments, it is possible to enhance object code execution performance and to decrease object code size.

What is claimed is:

1. A compiler which generates object codes based on a source program, comprising:
   an instruction detection section which detects instruction scheduling information described in said source program, the instruction scheduling information describing first and second operation instruction information and the number of cycles or the number of instructions to be secured between the object code corresponding to said first operation instruction information and the object code corresponding to said second operation instruction information; and
   an object code insertion section inserting an object code irrelevant to the object code corresponding to said first operation instruction information and the object code corresponding to the second operation instruction, between the object code corresponding to said first operation instruction information and the object code corresponding to the second operation instruction, by as much as said number of cycles or number of instructions.

2. A compiler according to claim 1, wherein
said object code insertion section inserts, between the object code corresponding to said first operation instruction information and the object code corresponding to the second operation instruction, another object code which does not use a hardware resource used by the object code corresponding to said first operation instruction information and the object code corresponding to the second operation instruction but which uses another hardware resource, by as much as said number of cycles or number of instructions.

3. A compiler according to claim 1, wherein
said hardware resource is at least one of an operation register and a memory.

4. A compiler according to claim 2, comprising:
a first movement determination section determining whether an object code to be executed just before the object code corresponding to said first operation instruction information is movable to a different code location; and
a first resource determination section determining whether the hardware resource used by the object code, which is determined to be movable by said first movement determination section, collides against the hardware resource used by the object code corresponding to said first operation instruction information, wherein
said object code insertion section moves the object code for which it is determined that the resources do not collide by said first movement determination section, between the object codecorresponding to said first operation instruction information and the object code corresponding to said second operation instruction information.

5. A compiler according to claim 2, comprising:
a second movement determination section determining whether an object code to be executed just after the object code corresponding to said second operation instruction information is movable to a different code location; and
a second resource determination section determining whether the hardware resource used by the object code, which is determined to be movable by said second movement determination section, collides against the hardware resource used by the object code corresponding to said second operation instruction information, wherein
said object code insertion section moves the object code for which it is determined that the resources do not collide by said second movement determination section, between the object code corresponding to said first operation instruction information and the object code corresponding to said second operation instruction information.

6. A compiler according to claim 1, wherein if a different movable object code is not present, said object code insertion section inserts an nop code between the object code corresponding to said first operation instruction information and the object code corresponding to said second operation instruction information.

7. A compiler according to claim 1, wherein
said instruction scheduling information is a specific function having, as factors, said first and second operation instruction information and the number of cycles or the number of instructions to be secured between the object codes corresponding to said first and second operation instruction information, respectively.

8. A compiler according to claim 7, wherein said specific function is a reserved word which is newly added to a description language of the source program.

9. A compiler according to claim 8, wherein said specific function consists of phrases other than reserved words specified under an ISO/IEC standard for C language.

10. A compiler according to claim 1, wherein said instruction scheduling information is a preprocessing directive which describes said first and second operation instruction information and the number of cycles or the number of instructions to be secured between the object codes corresponding to the first and second instruction information, respectively, and which is specified under an ISO/IEC standard for C language.

11. A compiler according to claim 1, wherein said instruction scheduling information is included in a function which is declared as an inline function specified under ISO/IEC 9899:1999 for C language, and said object code insertion section inserts, between the object code corresponding to said first operation instruction information and the object code corresponding to said second operation instruction information, object codes corresponding to instructions located before and after said instruction scheduling information developed in the source program.

12. A compiler according to claim 1, wherein said first and second operation instruction information is operation instruction information which is executed by an operation unit provided separately from a processor.

13. A compiler according to claim 12, wherein said operation unit is a coprocessor annexed to the processor.

14. An operation processing system which performs an operation processing in accordance with object codes generated based on a source program, comprising:
an operation processing section which performs operation processing, based on first and second operation instruction information and the number of cycles or the number of instructions to be secured between the object code corresponding to said first operation instruction information and the object code corresponding to said second operation instruction information, between the object code corresponding to said first operation instruction information and the object code corresponding to said second operation instruction information, based on a group of the object codes which are consisted of another object code which does not use a hardware resource used by the object code corresponding to said first operation instruction information and the object code corresponding to said second operation instruction information but which uses another hardware resource between the object code corresponding to said first operation instruction information and the object code corresponding to said second operation instruction information inserted by as much as said number of cycles or number of instructions.

15. An operation processing system according to claim 14, comprising:
a processor; and
an operation unit provided separately from the processor, wherein
said operation processing section is incorporated into said operation unit.

16. An operation processing system according to claim 15, wherein
said operation unit is a coprocessor connected to the processor.

17. An operation processing method for generating object codes based on a source program, comprising:
detecting instruction scheduling information described in said source program, first and second operation instruction information and the number of cycles or the number of instructions to be secured between the object code corresponding to said first operation instruction information and the object code corresponding to said second operation instruction information being described in the instruction scheduling information; and
inserting another object code, which does not use a hardware resource used by the object code corresponding to said first operation instruction information and the object code corresponding to said second operation instruction information but which uses another hardware resource, between the object code corresponding to said first operation instruction information and the object code corresponding to said second operation instruction information, by as much as said number of cycles or number of instructions.

* * * * *